(12) United States Patent
Sugimoto et al.

(10) Patent No.: US 7,964,171 B2
(45) Date of Patent: Jun. 21, 2011

(54) PROCESS FOR PRODUCING SILICON CARBIDE CERAMIC MICRO TUBE WITH THIN WALL

(75) Inventors: Masaki Sugimoto, Naka-gun (JP); Akira Idesaki, Naka-gun (JP)

(73) Assignee: Japan Atomic Energy Agency, Ibaraki (JP)

( * ) Notice: Subject to any disclaimer, the term of this patent is extended or adjusted under 35 U.S.C. 154(b) by 927 days.

(21) Appl. No.: 11/274,504

(22) Filed: Nov. 16, 2005

(65) Prior Publication Data
US 2006/0239887 A1    Oct. 26, 2006

(30) Foreign Application Priority Data

Nov. 16, 2004  (JP) .................. 2004-331648
Dec. 22, 2004  (JP) .................. 2004-371267

(51) Int. Cl.
*C01B 31/36*     (2006.01)
(52) U.S. Cl. ........................................ 423/345
(58) Field of Classification Search .................. None
See application file for complete search history.

(56) References Cited

U.S. PATENT DOCUMENTS

| | | | | |
|---|---|---|---|---|
| 6,194,066 | B1 * | 2/2001 | Hoffman | 428/367 |
| 6,635,215 | B2 * | 10/2003 | Sugimoto et al. | 264/430 |
| 6,780,370 | B2 * | 8/2004 | Sugimoto et al. | 264/434 |
| 2003/0057612 | A1 * | 3/2003 | Sugimoto et al. | 264/446 |

FOREIGN PATENT DOCUMENTS

| | | |
|---|---|---|
| JP | 2877424 | 1/1999 |
| JP | 2000-045130 | 2/2000 |
| JP | 2003-82532 | 3/2003 |

OTHER PUBLICATIONS

Idesaki et al, Application of electron beam curing for silicon carbide fiber syntheisi from blend polymer of polycarbosilane and polyvinylsilane, 2001, Radiation Physics and Chemistry, 60, pp. 483-487.*

Idesaki, et al. "Fine silicon carbide fibers synthesized from polycarbosilane-polyvinylsilane polymer blend using electron beam curing", Journal of Materials Science 36(2001), pp. 357-362.

Idesaki, et al. "Application of electron beam curing for silicon carbide fiber synthesis from blend polymer of polycarbosilane and polyvinylsilane", Radiation Physics and Chemistry 60(2001), pp. 483-487.

(Continued)

*Primary Examiner* — Melvin C Mayes
*Assistant Examiner* — Stefanie Cohen

(57) ABSTRACT

An improved process for producing a silicon carbide ceramic micro tubes (SiC micro tube) from a silicon-based polymer fiber by applying an ionizing radiation such that the surface part of the fiber selectively undergoes oxidative crosslinking, extracting the uncrosslinked core part of the fiber with an organic solvent to form a hollow fiber, and firing it in an inert gas is characterized by using a polymer blend of polycarbosilane and polyvinylsilane as the silicon polymer or applying the ionizing radiation to the silicon-based polymer fiber as it is cooled. The two methods may be performed either individually or in combination to produce tubes with their wall thickness controlled at a desired value in the range of 2-10 μm although this has been impossible to achieve in the prior art.

3 Claims, 4 Drawing Sheets

OTHER PUBLICATIONS

Idesaki, et al. "Fine SiC fiber synthesized from organosilicon polymers: relationship between spinning temperature and melt viscosity of precursor polymers", Journal of Materials Science 36(2001), pp. 5565-5569.

Narisawa, et al. "Thermal oxidation crosslinking in the blended precursors of organosilicon polymers containing polyvinylsilane with polycarbosilane", Journal of Materials Science 33(1998), pp. 2663-2666.

Narisawa et al. "Use of Blended Precursors of Poly(vinylsilane) in Polycarbosilane for Silicon Carbide Fiber Synthesis with Radiation Curing", J. Am. Ceram. Soc., 82 [4] (1999), pp. 1045-1051.

Japanese Office Action dated Nov. 12, 2009 issued in corresponding Japanese Patent Application 2004-331648.

* cited by examiner

PROCESS FOR PRODUCING SILICON CARBIDE CERAMIC MICRO TUBE WITH THIN WALL

BACKGROUND OF THE INVENTION

This invention relates to processes for producing silicon carbide ceramic micro tubes (SiC micro tube) having outside diameters of from several to several hundred microns and wall thicknesses of several microns. The invention further relates to processes for producing SiC micro tube while permitting their wall thickness to be controlled at a desired value within the range of 2-20 μm.

SiC is a material of high resistance, high strength and low reactivity and SiC fiber synthesized from silicon-based polymers has already been commercialized whereas active research efforts are being made to use the SiC fiber as a reinforcement and produce SiC fiber reinforced SiC composite materials. The current method for producing SiC micro tube comprises the following steps:
1. spinning a silicon polymer to make a fiber having a diameter of several tens of microns;
2. applying an ionizing radiation to the fiber in the air at room temperature such that the surface part of the fiber is selectively oxidized;
3. heat treating the fiber in an inert gas to crosslink the oxidized layer so that it becomes insoluble in a solvent;
4. extracting the uncrosslinked core part of the fiber with an organic solvent to make it hollow; and
5. heat treating the resulting polymer tube in an inert gas at 1000° C. and above so that it becomes ceramic.

While it is possible to control the wall thickness of the tube by changing the dose rate and oxygen partial pressure employed in irradiation, the smallest wall thickness that can be achieved for tubes presently produced by irradiation with electron beams at room temperature is about 10 microns [U.S. Pat. No. 6,780,370; Development of Silicon Carbide Micro Tube from Precursor Polymer by Radiation Oxidation, Masaki Sugimoto and others, Key Eng. Mater., 247, 133-136 (2003); "Denshisen no shosha koka de jitsugen shita tanka keiso seramikkus maikuro chubu (Silicon Carbide Ceramic Micro tubes Realized by the Irradiating Effect of Electron Beams)", Masato Yoshikawa and Masaki Sugimoto, ConverTec, 377, pp. 56-60 (2004)].

The method under consideration is capable of controlling the wall thickness of the SiC micro tube by changing the dose rate and oxygen partial pressure employed in irradiation; however, in the irradiation with electron beams at room temperature, the energy of the electron beams applied is absorbed by the fiber and its temperature is elevated, making it difficult to control the wall thickness of the tube at 10 μm and below. Therefore, it is impossible to make a hollow tube from the industrially mass-produced 15 μmφ SiC fiber with its wall thickness controlled to any value that suits an intended use.

The present invention provides a process for producing a SiC micro tube from a silicon-based polymer fiber with its wall thickness controlled to a desired value within the range of 2 to 20 μm either by starting from a polymer blend of two silicon-based polymers, polycarbosilane and polyvinylsilane, or by cooling the silicon-based polymer fiber during irradiation with electron beams. The use of the polymer blend as the starting material has the additional advantage of simplifying the conventional process by eliminating the step of heat treatment.

SUMMARY OF THE INVENTION

In the Case of Using the Silicon-Based Polymer Blend as the Starting Material The present inventors noted that polyvinylsilane (PVS), a silicon-based polymer, has higher reactivity with oxygen than the conventionally used starting material polycarbosilane (PCS). They found that when a fiber of the PCS/PVS polymer blend was irradiated in the air, the thickness of the oxidized surface part could be reduced and this finding has led to the accomplishment of the present invention.

When the silicon-based polymer fiber is irradiated in the air, active radicals are generated uniformly within the fiber and react with oxygen. At higher dose rates of radiation, oxygen diffuses from the fiber surface into its core part faster than it reacts with the active radicals in the neighborhood of the fiber surface, with the result that the surface part of the fiber is selectively oxidized. Since the highly reactive Si—H bonds are more abundant in PVS than PCS, the reaction on the part of the fiber is accelerated in the polymer blend compared to the conventional case of using PCS alone. As a result, the thickness of the oxidized layer decreases and the wall thickness of the SiC micro tube can be reduced to 5 microns and even less. In the conventional case of using PCS alone, a heat treatment following the irradiation contributes to advanced crosslinking but the present inventors found that when PCS was blended with PVS, crosslinking proceeded right after irradiation and they could successfully produce a SiC micro tube without performing heat treatment after the irradiation. This contributes to simplifying the conventional production process.

In addition, taking advantage of the high reactivity between PVS and oxygen, the proportions of PCS and PVS may be varied to control the oxidation reaction that is taking place on the part of the fiber, to thereby control the thickness of the oxidized layer. Thus, by increasing the proportion of PVS, one can produce a SiC micro tube with an even thinner wall. In the present invention, PCS is blended with 5 wt % to less than 30 wt %, preferably 10 to 25 wt %, of PVS. If the proportion of PVS is 30 wt % or more, the blend will turn into a gel and cannot be shaped into fiber form. If the proportion of PVS is less than 5 wt %, the desired thin-walled SiC micro tube of the present invention cannot be obtained.

According to the process of the present invention, SiC micro tube having wall thicknesses of 5 microns and less can be produced, with the added advantage of simplifying the conventional production process.

(In the Case of Irradiating the Silicon-Based Polymer Fiber as it is Cooled)

The present invention also provides a process for producing SiC micro tubes having wall thicknesses of 2-10 μm by applying an ionizing radiation under controlled conditions. The present inventors noted that the thickness of the silicon-based polymer layer to be oxidized by ionizing radiation relates to the amount of active radicals that are generated by cutting the silicon polymer under the action of the ionizing radiation and the amount of oxygen that diffuses from the surface part of the silicon polymer to get into its interior and that the amount of oxygen diffusion can be controlled by the temperature of the sample during irradiation; noting this point, the present inventors conducted intensive studies and have eventually accomplished the present invention.

This accomplishment is based on the following theory. When the silicon-based polymer fiber is irradiated in the air, active radicals are generated uniformly within the fiber and react with oxygen. At higher dose rates of radiation, oxygen diffuses from the fiber surface into its core part of the fiber faster than it reacts with the active radicals in the neighborhood of the fiber surface, with the result that the surface part of the fiber is selectively oxidized. If the sample is cooled as it is irradiated, the rate of oxygen diffusion into the silicon polymer is reduced and less oxygen diffuses into the fiber in unit time so that all of the oxygen reacts with the active radicals in areas closer to the surface part of the fiber, with the result that the wall thickness corresponding to the oxidized portion becomes smaller.

Therefore, the present invention particularly relates to a process for producing a SiC micro tube comprising the steps of applying an ionizing radiation to a silicon-based polymer fiber as it is cooled at a temperature between −40° C. and 0° C. so that its part of the fiber is selectively oxidized, crosslinking the oxidized portion of the fiber by heat treatment, extracting the uncrosslinked central portion of the fiber with an organic solvent to make a hollow fiber, and firing the hollow fiber in an inert gas to make a tube with its wall thickness adjusted at a desired value within the range of 2-10 μm.

According to this process of the present invention, a SiC micro tube having an outside diameter of 15 μm can be produced while assuring that the wall thickness of a polycarbosilane polymer having an outside diameter of 20 μm as the industrially mass-produced silicon-based polymer fiber is controlled at a desired wall thickness.

DETAILED DESCRIPTION OF THE INVENTION

Figure 1:
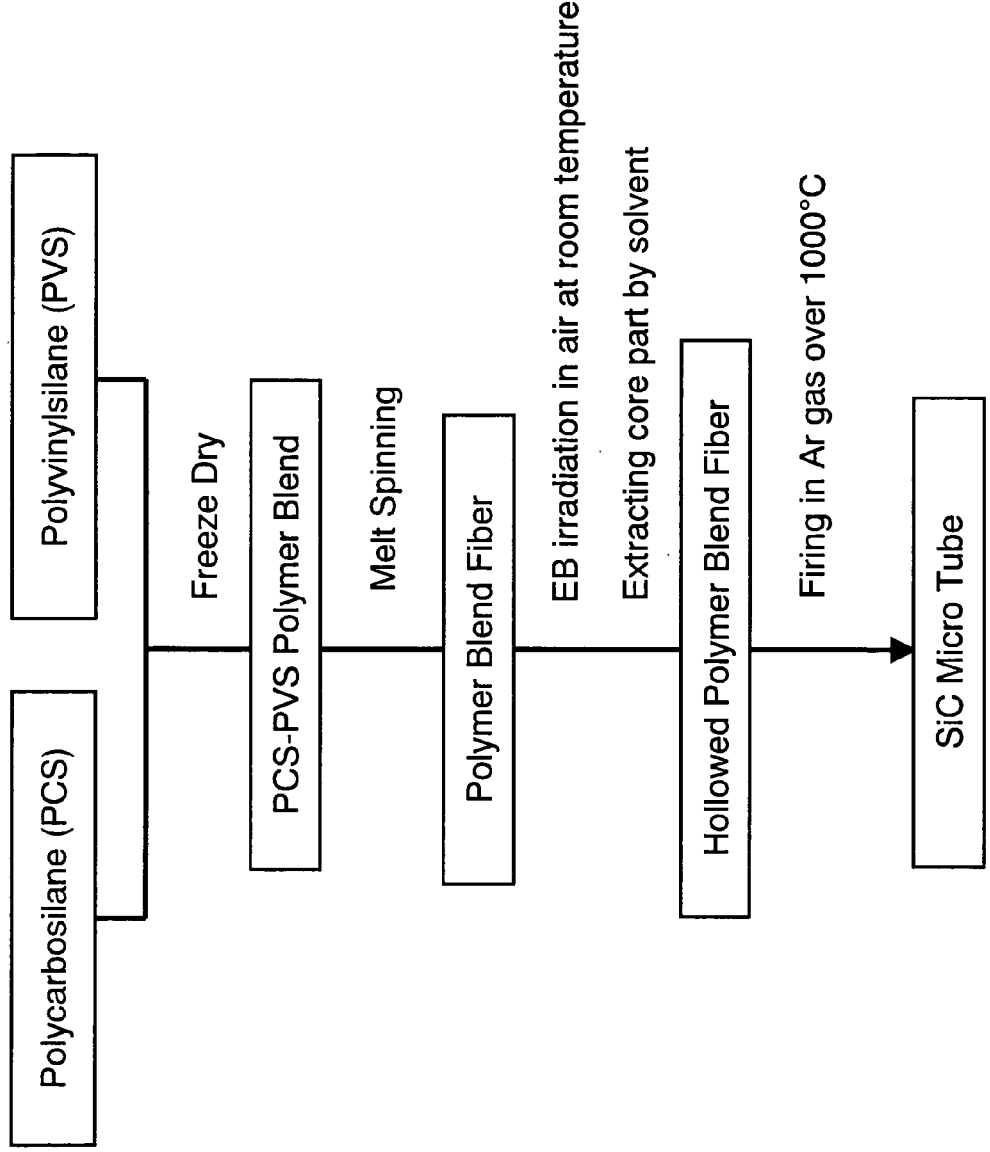
FIG. 1 is a schematic diagram showing an exemplary sequence of the steps in one of the two processes for producing a SiC micro tube according to the present invention.

FIG. 1 shows an exemplary sequence of the steps in one of the two invention processes for producing a SiC micro tube involving irradiation. First, polycarbosilane and polyvinylsilane are mixed at specified proportions and freeze-dried to make a polymer blend, which is then melt spun into a fiber. Subsequently, the fiber is oxidized by irradiation with electron beams at room temperature. If the temperature of the fiber is unduly elevated by the energy of the electron beams applied, thermal oxidation of the silicon-based polymer blend will proceed simultaneously, making it difficult to control the oxygen concentration and its profile in the fiber's cross-sectional direction. Therefore, in order to ensure that only the surface part of the fiber is oxidized, the temperature of the fiber is desirably held at 50° C. or below during irradiation.

In the next step, the oxidized fiber is held in an organic solvent that is capable of dissolving silicon-based polymers, such as THF (tetrahydrofuran), xylene or benzene, so that the uncrosslinked central portion of the fiber is extracted. The resulting hollow fiber is then fired at 1000° C. or above in an inert gas so that it is converted to ceramic, whereby a SiC micro tube is produced.

Figure 3:
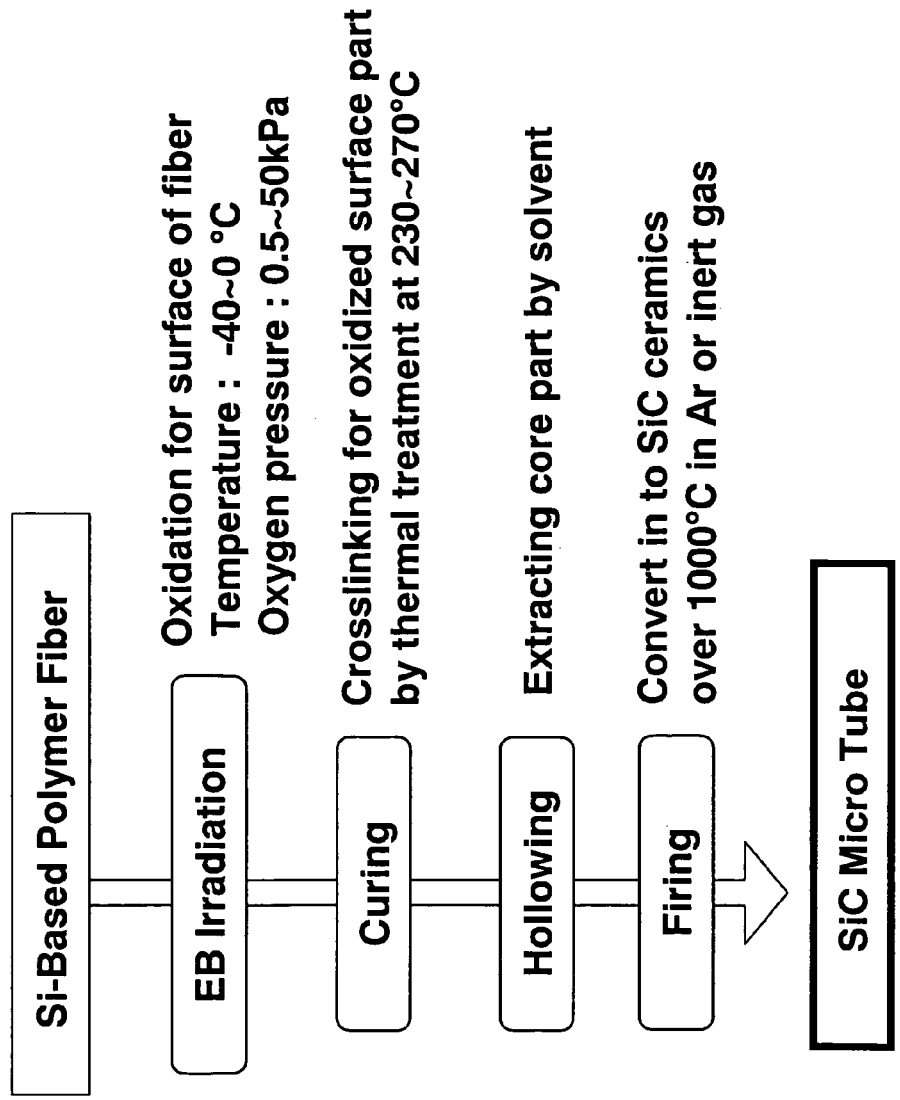
FIG. 3 is a schematic diagram showing an exemplary sequence of the steps in the other process for producing a SiC micro tube according to the present invention by cooling the fiber as it is irradiated with electron beams.

FIG. 3 shows an exemplary sequence of the steps in the other invention process for producing a SiC micro tube involving irradiation. A silicon polymer fiber feed is passed through a mixture of an inert gas and oxygen (oxygen partial pressure: 0.5-50 kPa) at a temperature between −40° C. and 0° C. as it is irradiated with electron beams to oxidize the surface part of the fiber. The total dose of electron beams to be applied needs to be larger than the dose that causes the silicon polymer to be crosslinked with oxygen but smaller than the dose that causes the central portion of the fiber to be crosslinked by radiation in the absence of oxygen; to state specifically, the dose setting needs to be in the range of 1-5 MGy.

The silicon polymer fiber selectively oxidized at the surface part of the fiber is heat treated in an argon atmosphere or under vacuum to crosslink the oxidized portion, which then becomes insoluble in solvents. In this treatment, an appropriate temperature that corresponds to the amount of oxygen introduced into the fiber is set within the range of 230-300° C. The next hollowing step is carried out by holding the fiber in an organic solvent that is capable of dissolving the uncrosslinked silicon polymer, such as cyclohexane or THF (tetrahydrofuran). Subsequently, the fiber is heated up to 1000° C. or more in an inert gas atmosphere, whereby the silicon polymer is converted to ceramic and one obtains a SiC micro tube.

On the following pages, the present invention is described more specifically by reference to examples.

Example 1

Two silicon-based polymers, polycarbosilane (PCS) and polyvinylsilane (PVS), were mixed at proportions of 80 wt % and 20 wt %, respectively, and freeze-dried to make a polymer blend, which was then melt spun into a fiber having a diameter of about 30 microns. The PCS had a molecular weight of about 2000 and a melting point of 238° C.; its molecular structure is represented by the following formula (1) where the ratio of m to m' is nearly unity. The PVS had a molecular weight of about 960 and was liquid at room temperature; its molecular structure is represented by the following formula (2) where the ratio of n to n' is nearly unity.

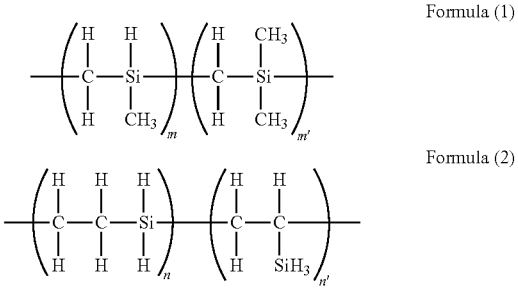

Formula (1)

Formula (2)

Figure 2:
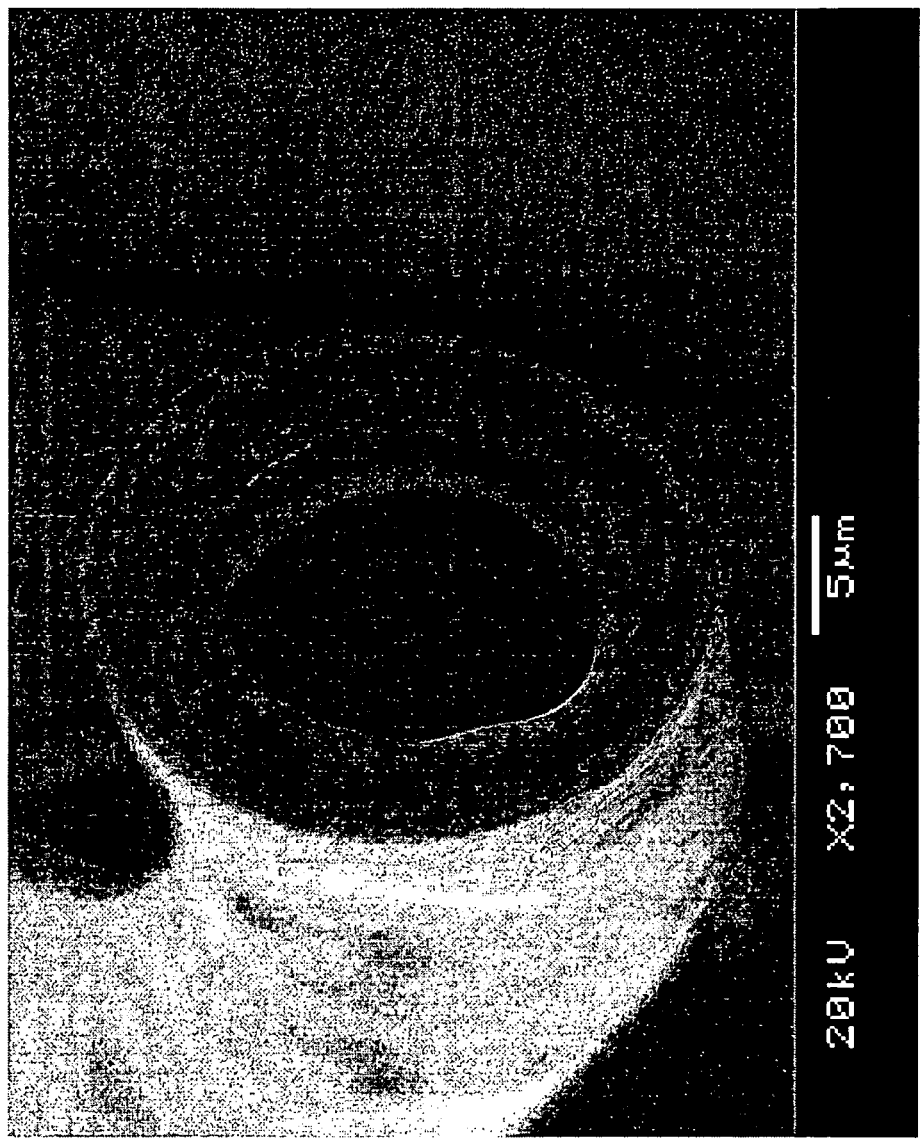
FIG. 2 is a scanning electron micrograph (20 keV; ×2000) of a SiC micro tube produced by the present invention.

The fiber was placed on a water-cooled copper plate and irradiated with 2 MeV of electron beams up to a dose of 1 MGy at a dose rate of 0.395 kGy/sec in dry air at room temperature. After the irradiation, the uncrosslinked central portion of the fiber was extracted with tetrahydrofuran (THF) at room temperature to make a hollow fiber. The resulting hollow fiber was fired at 1000° C. in an argon atmosphere to make a SiC micro tube. The thus obtained SiC micro tube had an outside diameter of about 12 microns and a wall thickness of about 3 microns. A scanning electron micrograph of the SiC micro tube is shown in FIG. 2.

Example 2

Figure 4:
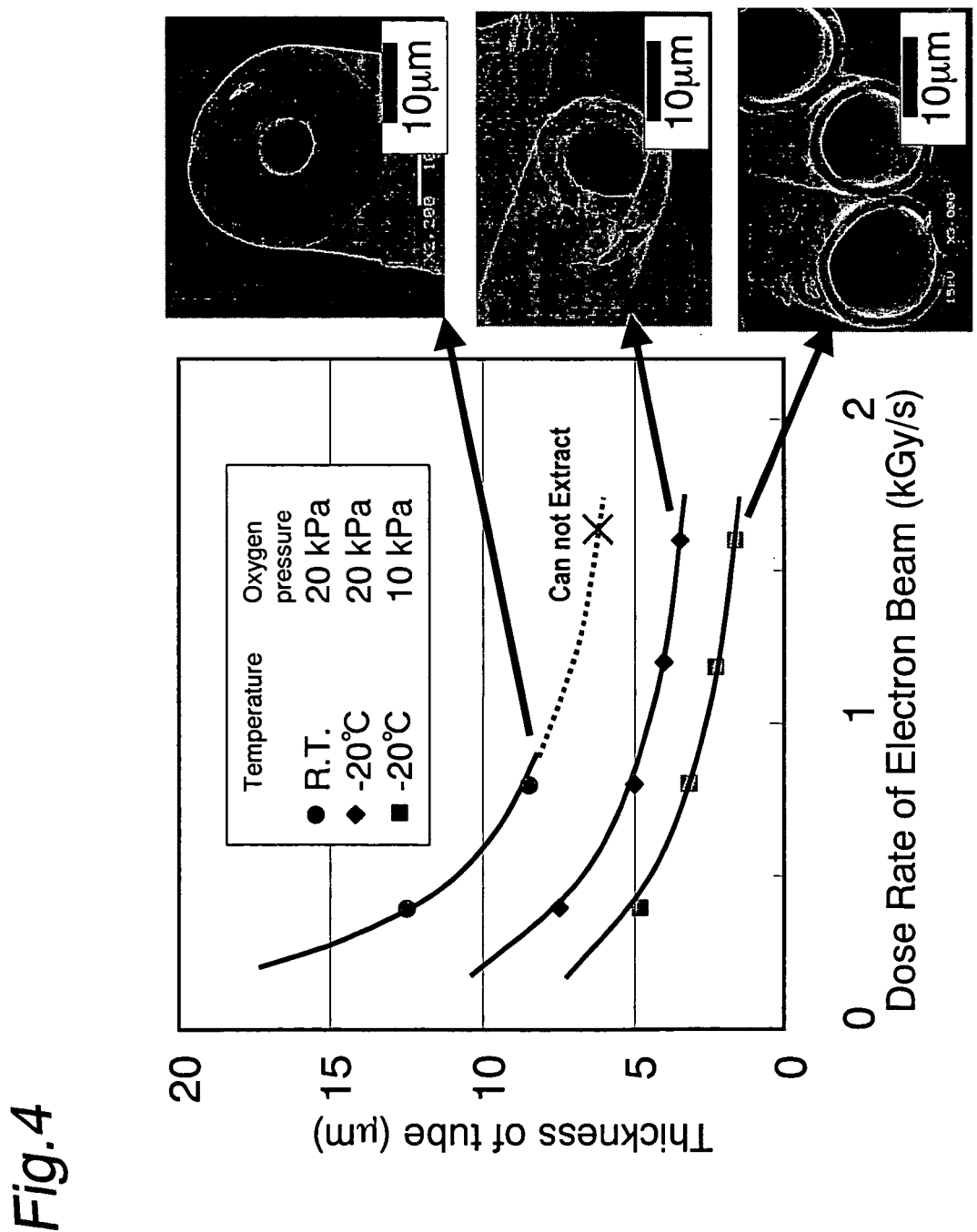
FIG. 4 is a graph showing the results of measuring the wall thickness of SiC micro tube synthesized by the present invention.

The silicon polymer polycarbosilane (PCS) as the SiC ceramic feed material was drawn to a fiber having an outside diameter of 20 μm. The fiber was placed on a sample holder that could be cooled by the heat of vaporization of liquefied carbon dioxide and inserted into a gas-purgeable EB irradiation vessel, where it was irradiated with 2 MeV of electron beams up to a dose of 2.4 MGy at a dose rate of 0.4-1.6 kGy/sec under the flow of a helium/oxygen mixed gas. After the irradiation, the fiber was heated in an inert gas or under vacuum at a temperature in the range of 200-300° C., whereby the oxidized surface part of the fiber was crosslinked to become insoluble in organic solvents. The uncrosslinked central portion of the fiber was extracted with an organic solvent such as cyclohexane or THF at room temperature to make a hollow fiber. The resulting hollow fiber was fired at 1000° C. in argon to make a SiC micro tube. The thus obtained micro SiC micro tube had an outside diameter of about 15μ, with its wall thickness determined by temperature, oxygen partial pressure, and the dose rate of electron beams, as shown in FIG. 4. The lower limit of the wall thickness was about 10 μm in the case of irradiation at room temperature. When EB irradiation was performed at −20° C., the wall thickness of the SiC micro tube could be controlled over the range of 4-10 μm at an oxygen partial pressure of 20 kPa and over the range of 2-5 μm at an oxygen partial pressure of 10 kPa.

To be more specific, when electron beams were applied at room temperature and at an oxygen partial pressure of 20 kPa, the SiC micro tube had large wall thickness on average, with the lower limit being about 8 μm (see the top curve in FIG. 4); when electron beams were applied at −20° C. and at an oxygen partial pressure of 20 kPa, the SiC micro tube had an average wall thickness of 4-10 μm (see the middle curve); and when electron beams were applied at −20° C. and at an oxygen partial pressure of 10 kPa, the SiC micro tube had an average wall thickness of 2-5 μm (see the bottom curve).

SiC obtained from silicon-based polymers assumes an amorphous structure and is selectively permeable to hydrogen gas. If the SiC micro tube of the present invention is applied as a gas separating filter, its large part of the fiber contributes to higher efficiency, which in turn enables it to be applied in the thermochemical iodine-sulfur cycle process of hydrogen production and other processes that require the use of heat-resistant and corrosion-resistant gas separating filters.

What is claimed is:

1. A process for producing a silicon carbide ceramic micro tube (SiC micro tube), comprising:
    applying an electron beam radiation to a silicon-based polymer blend fiber consisting of polycarbosilane and polyvinylsilane under an oxygen atmosphere such that its surface selectively undergoes oxidative crosslinking, wherein the amount of polyvinylsilane is 5 wt % to less than 30 wt %, wherein the temperature of the fiber during radiation is 50° C. or below;
    removing the uncrosslinked central portion of the fiber with an organic solvent to make a hollow fiber; and
    firing the hollow fiber in an inert gas, wherein
    the micro tube has a wall thickness of no more than 5 μm, and
    heat treatment is not conducted between the applying an electron beam radiation and the removing of the uncrosslinked central portion.

2. The process according to claim 1, wherein the proportions of polycarbosilane and polyvinylsilane are varied to control the wall thickness of the micro tube.

3. The process according to claim 1, wherein the silicon-based polymer blend fiber is cooled as the fiber is irradiated for crosslinking so as to control the wall thickness of the micro tube.

* * * * *

UNITED STATES PATENT AND TRADEMARK OFFICE
CERTIFICATE OF CORRECTION

| | | |
|---|---|---|
| PATENT NO. | : 7,964,171 B2 | Page 1 of 1 |
| APPLICATION NO. | : 11/274504 | |
| DATED | : June 21, 2011 | |
| INVENTOR(S) | : Masaki Sugimoto et al. | |

It is certified that error appears in the above-identified patent and that said Letters Patent is hereby corrected as shown below:

On the Title Page Item (56) (Other Publications), Line 1, Delete "1. Idesaki et al, Application of electron beam curing for silicon carbide fiber syntheisi from blend polymer of polycarbosilane and polyvinylsilane, 2001, Radiation Physics and Chemistry, 60, pp. 483-487."

Signed and Sealed this
Twenty-seventh Day of September, 2011

David J. Kappos
*Director of the United States Patent and Trademark Office*